Figure 1:
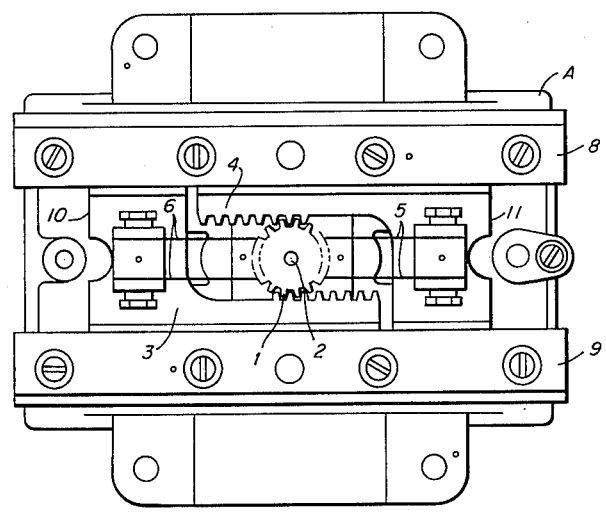

Dec. 12, 1961     M. C. MAGARIAN     3,012,326
GUN SIGHT GEAR RACK PLAY COMPENSATOR
Filed Dec. 30, 1957

INVENTOR.
MAJOR CHARLES MAGARIAN
BY
ATTORNEYS

United States Patent Office 3,012,326
Patented Dec. 12, 1961

3,012,326
GUN SIGHT GEAR RACK PLAY COMPENSATOR
Major Charles Magarian, 1921 Tennessee St.,
Vallejo, Calif.
Filed Dec. 30, 1957, Ser. No. 706,223
2 Claims. (Cl. 33—49)
(Granted under Title 35, U.S. Code (1952), sec. 266)

The invention described herein may be manufactured and used by or for the Government of the United States of America for governmental purposes without the payment of any royalties thereon or therefor.

The present invention relates to gyro gun sights and, more particularly, to the range racks of such gun sights as the Mk 14, Mod 6, 8 and 15.

As is well known to those familiar with gyro gun sights, the range racks of the particular sights mentioned above must have an extremely close fit with their range tracks, the permissible tolerance of the fit usually being within approximately 0.2 of one one-thousandth of an inch. If the tolerance substantially exceeds this amount, the resulting shift permitted in the range rack is so great as to destroy the accuracy of the gun sight. Of course, range racks having such tolerance have been for some time manufactured and the tolerance itself is by no means too difficult to achieve. However, in actual use of the sight, the rack must be repeatedly reciprocated and it has been found that the heat of friction generated by reciprocation is sufficient to produce a relative expansion or contraction which in turn destroys the desired tolerance and produces an excessive range rack shift.

This particular problem has been recognized by fabricators and users of the sights and various attempts have been made to eliminate it. For example, the most common expedient, if not the only one presently utilized, is that of injecting a heavy oil into the space between the rack and its range track, and while such an expedient is for a limited time entirely successful, experience also has shown that this measure is more of a temporary remedy rather than a permanent cure. Thus, for a limited time, the heavy oil is entirely capable of so minimizing the heat of friction as to effectively reduce relative expansion. On the other hand, after the sight has been used for a short period, the oil itself breaks down under the intensive heat generated by the reciprocation with the result that the oil either runs out of the clearance space or becomes so thin as to no longer be effective. When this occurs, the reciprocating members again are subjected to sufficient heat to produce the undesirable expansion and the tolerance then may become so excessive as to completely destroy the accuracy of the sight itself.

A primary object of the present invention is to eliminate this excessive range rack shift produced by continued rack reciprocation.

Another object is to compensate for undesirable relative movement between the rack and the track, and, more specifically this object contemplates the use of a leaf spring.

Figure 2:
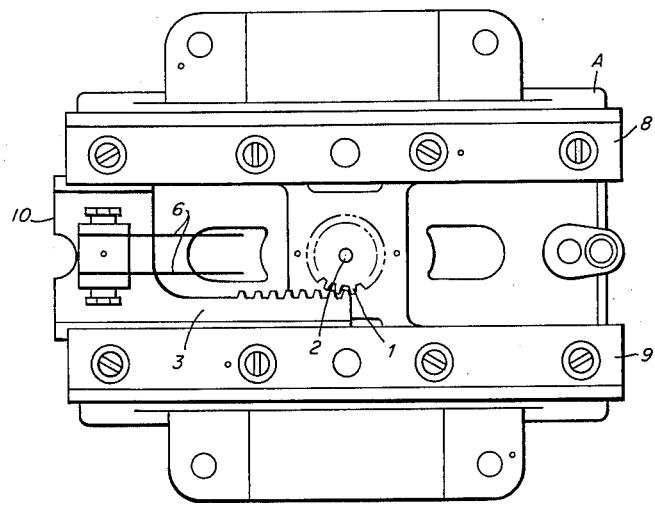
Figure 3:
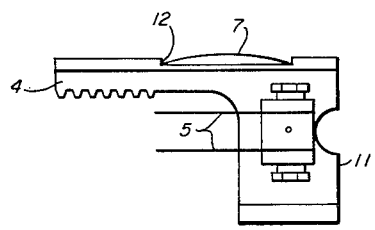

Other objects and advantages of the invention will hereinafter become more fully apparent from the following description of the annexed drawings, which illustrate a preferred embodiment, and wherein:

FIG. 1 is a plan view of the apparatus;
FIG. 2 is a view similar to FIG. 1 with one of the range racks removed; and
FIG. 3 is a plan view of a range rack.

Referring now to the drawings, there is shown in FIG. 1 a range apparatus A for eliminating bore sight range shift. Gear 1 is mounted on a shaft 2 which is connected to a yardage range hand control (not shown) through bevel gears (not shown). Gear 1 meshes with the rack teeth of range racks 3 and 4 so that, as gear 1 is turned clockwise (FIG. 1) range rack 3 moves to the left and range rack 4 moves to the right. Conversely, when gear 1 is turned counterclockwise range rack 3 moves to the right and range rack 4 moves to the left.

Range rack 3 is slidably positioned in a range track 9 of range apparatus A and range rack 4 is slidably positioned in another range track 8. Range rack 3 has mounted thereon a mounting 10 which holds parallel range springs 6, 6 and range rack 4 has a mounting 11 for holding parallel range springs 5, 5. These range springs receive forks (not shown) from a gyro and by moving the range springs either closer or farther apart relative to one another the forks are allowed either a smaller or a greater freedom of movement. As a gyro by its turning movement leans in one direction only it is understandable that the greater the freedom of play for the forks of the gyro within the range springs the more the gyro leans in the one direction.

This principle of gyro rotation is employed through the hand control which has graduations according to distance and automatically allows for the lead of a gun on the target as the boresight of the gun is aligned with the target. If the distance is short, the hand control is turned to bring the range springs together and the forks of the gyro have a minimum freedom of play. Consequently, for short distances, the boresight is automatically lined up on the target with no compensation for the gun to lead the target. However, at a long distance, the hand control is turned to the proper yardage graduation and the springs are moved away from one another allowing the forks greater freedom of play and the gyro automatically compensates for the greater range and leads the target by the desired amount as the boresight is lined up with the target.

From the above operational analysis it will be apparent that the accuracy of the gun or, in other words, the ability of the gun to correctly lead a distant target, is to a large degree dependent upon the relative position of springs 5 and 6. As will be appreciated, this relative distance not only is subject to variation by the intentional movement of the range racks toward or away from each other, but in addition the relative distance also is affected by any unintentional and undesirable canting or oblique movement of one of the racks such as might be produced if the racks themselves are permitted excessive vertical play within their tracks. As has been pointed out, when the range racks initially are fabricated, the tolerance permitted between the racks and their respective tracks is held to a minimum which will not inject any error into the apparatus. Nevertheless, experience has shown that the rather high temperatures generated during operation produce such relative expansion as to permit an excessive play which either must be eliminated or effectively compensated.

Prior efforts which have contemplated this excessive play have been directed at its elimination through the injection of a heavy oil which unfortunately very shortly breaks down. In the present invention, the difficulty is solved by incorporating particular leaf springs 7, 7, for the purpose of compensating rather than eliminating the play.

As may be seen in the drawings, such springs are mounted in specially formed notched or cut-out portions 12 provided in each of the range racks, and with the springs properly mounted in their cut-outs, it will be seen that the spring itself bears against and rides along the range track. As a result, any relative expansion of the track away from the rack member is immediately and effectively compensated by a corresponding expansion of springs 7, 7. On the other hand, when no appreciable expansion is involved, the initial tolerance between the racks and their tracks in permitted so that the sight retains its built-in accuracy at all times. In other words, without any relative expansion, the initial tolerance produces the fabricated accuracy. However, at such time as any relative expansion is introduced, the spring automatically expands a proper amount to maintain the minimum tolerance and, more important, to maintain range springs 5 and 6 at all times in a relative parallel disposition. As indicated, this relative parallelism is essential to accuracy because any departure from it affects the gyro which in turn controls the amount by which the target itself is lead.

The advantages of the present improvement should be somewhat obvious, particularly as regards the manner in which the relative expansion of the range rack mounting is compensated. However, even beyond this particular advantage, it is to be noted that the addition of the leaf springs is more of a permanent cure than a simple temporary remedy. For example, the heavy oil previously used was found to be effective under operating conditions for a very short period of time which might amount to no more than a few days. As a result, the range racks required constant maintenance and checking so as to assure accuracy when needed. Further, that the injected oil was performing effectively could never be assured unless the range rack itself were overhauled before each operation. As will be appreciated, such uncertainty not only resulted in expansive maintenance but also at times produced inaccuracies which meant the difference between a direct hit or miss. The present innovation of the leaf spring is of a relatively permanent effect in that the expansion or contraction of the rack mounting no longer is of any particular concern. The spring itself can be formed of a material of sufficient strength to last for a considerable period of time which at least would cover any particular campaign. More important, it has been found through actual usage that such a spring, even though it may appear to be a relatively minor addition, has operated in such a manner as to assure accuracy and therefore to provide the actual difference between a hit or a miss.

Obviously many modifications and variations of the present invention are possible in the light of the above teachings. It is therefore to be understood that within the scope of the appended claims the invention may be practiced otherwise than as specifically described.

I claim:
1. Boresight apparatus comprising a pair of spaced frames having mutually parallel tracks provided one in each of said pair, a gear centrally disposed in said space between said mutually parallel tracks, a pair of range racks each having an elongate track-engaging surface slidably mounted one in each of said tracks, each of said range racks projecting outwardly of its track and having one end of its outwardly projecting portion slidably engaged in the track of the other of said pair of frames and the other end of its outwardly projecting portion provided with teeth for meshing with said gear, each of said racks further being provided on its elongate track-engaging surface with a notched-out portion, and resilient means mounted in each of said notch portions, said resilient means projecting outwardly from said notch into contact with its proximate track whereby said racks maintain the parallelism of said tracks regardless of tolerances developed in said apparatus.

2. Boresight apparatus comprising a pair of spaced frames having mutually parallel tracks provided one in each of said pair, a gear centrally disposed in said space between said mutually parallel tracks, a pair of range racks each having an elongate track-engaging surface slidably mounted one in each of said tracks, each of said range racks projecting outwardly of its track and having one end of its outwardly projecting portion slidably engaged in the track of the other of said pair of frames and the other end of its outwardly projecting portion provided with teeth for meshing with said gear, each of said racks further being provided on its elongate track-engaging surface with a notched-out portion, and a leaf spring mounted in each of said notch portions, said leaf springs projecting outwardly from said notch into contact with its proximate track whereby said racks maintain the parallelism of said tracks regardless of tolerances developed in said apparatus.

References Cited in the file of this patent
UNITED STATES PATENTS

| | | |
|---|---|---|
| 1,150,771 | Keuffel | Aug. 17, 1915 |
| 1,447,307 | Hopkinson | Mar. 6, 1923 |
| 1,536,206 | Gilbert | May 5, 1925 |
| 1,719,273 | McAdam | July 2, 1929 |
| 2,609,606 | Draper et al. | Sept. 9, 1952 |

FOREIGN PATENTS

| | | |
|---|---|---|
| 217,493 | Great Britain | June 19, 1924 |
| 215,881 | Switzerland | Nov. 1, 1941 |
| 776,052 | Great Britain | June 5, 1957 |